UNITED STATES PATENT OFFICE.

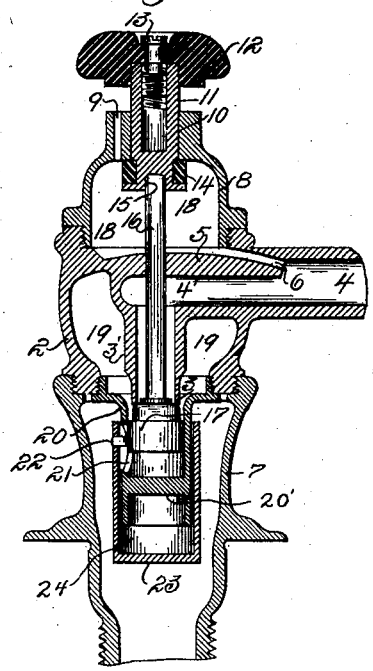
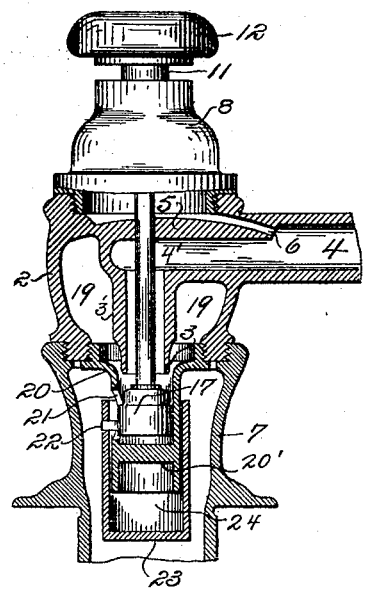
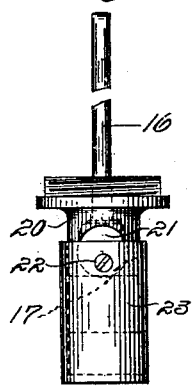
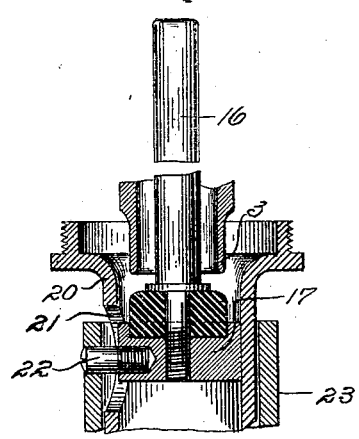
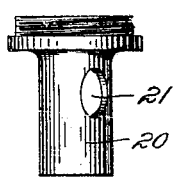

FREDERIC H. MASON, OF SPOKANE, WASHINGTON.

VALVE.

No. 814,791.  Specification of Letters Patent.  Patented March 13, 1906.

Application filed November 18, 1903. Serial No. 181,579.

*To all whom it may concern:*

Be it known that I, FREDERIC H. MASON, a citizen of the United States, residing at Spokane, county of Spokane, State of Washington, have invented a new and useful Improvement in Valves, of which the following is a specification.

The principal purposes of my invention are to provide, first, an automatic valve which closes by the pressure of fluid without the necessity of a spring or other equivalent power and which does not require a by-pass for closing the same; second, a valve which can be opened against very light pressures and will close quietly under such pressure without any chattering, vibration, or resultant water-hammer and under very low pressure with certainty without any mechanical or external assistance; third, a valve which will automatically open by atmospheric pressure, whether in vertical or horizontal position when the fluid-pressure is cut off, thereby draining the valve and the supply-pipes to which it is attached, and, fourth, a valve having an inexpensive construction around the bonnet and valve-stem without the use of a diaphragm, stuffing-box, or packing and preventing any drip from the delivery-spout after releasing the valve.

I will illustrate and describe my invention as applied to an ordinary vertical self-closing basin-cock for controlling and delivering water under pressure; but it will readily be understood by those skilled in the art that my invention applies as well to horizontal bibs and faucets and to valves of various kinds and for various purposes used to control, divert, or deliver not only water but fluids and gases of different kinds under pressure, such as steam, gas, and compressed air.

While I shall describe with exactness and minuteness the preferred form of construction as seen in the drawings and their mode of operation, it is by no means to be assumed that my invention as expressed in the broader claims is to be limited therefor to the particular contours and assemblage so specifically described. I myself have already devised many modifications, but embodying the same fundamental regulating principle, and any skilled mechanic can do the same as soon as he grasps my theory of construction and use. Their modifications pictorially may be quite unlike the original, but yet employ substantially the same means, coacting in substantially the same way to produce substantially the same result.

Referring to the drawings, Figure I is a central vertical section through the assembled apparatus, showing the main valve closed. Fig. II shows the bonnet in elevation, but the rest of the structure in central vertical section with the valve depressed and open. Fig. III is a detail in side elevation of the regulating device. Fig. IV is an enlarged detail, in vertical section, of the main valve and the regulating device. Fig. V is a detail in elevation of the piece constituting the fixed balancing-valve chamber, in which moves the main valve; and Fig. VI a like view of the movable balancing-valve.

In the accompanying drawings, 2 is the central or main section or shell of my improved valve. Within the shell is a central depending tube 3', its open lower end constituting the main valve-seat 3 and its upper end meeting the horizontal passage 4', leading to the somewhat larger delivery-spout 4. The upper wall of the passage 4' and of the space 19 around the said depending tube 3' forms the bridge 5, which divides the fluid-supply from the bonnet-chamber 18 above it. This chamber 18 has a vent extending from the bottom of the same (which is the upper surface of the bridge 5) to the spout 4, where it is increased in diameter over the passage 4'. The said chamber 18 is formed between the bridge 5 and the bonnet or cap 8, which forms the top section of my valve and has the vent 9 open to the atmosphere.

Reciprocatory vertically within the opening 10 in the upper end of the bonnet is the shank 11 of the push knob or button 12, secured to the shank by the screw 13. The shank has the packing 14 and the socket 15 to receive the upper end of the valve-stem 16 of the main valve 17, which lies below and fits on the valve-seat 3, the said valve-stem extending up through the tube 3', an opening in the bridge 5, and the bonnet-chamber 18.

The chambers 18 and 19 constitute air-chambers, the latter of which reduces the tendency to the production of a water-hammer by giving the water an opportunity to travel beyond the inlet and the valve-seat after the valve is seated.

Secured to the bottom of the central section 2 is the lower section 7 of my valve, to which section the usual supply-pipe is connected in any approved manner. Within the section 7 is the valve-chamber 20, also secured to the section 2, but preventing fluid from passing from the section 7 into the section 2 or the tube 3' therein except by way of the valve-chamber, which has a lateral port 21 leading from the section 7 into the chamber 20 at some distance from its upper end.

Secured by the screw 22 to the valve 17 is the supplemental valve 23, which is a sleeve slidable on the chamber 20, which is closed below the port 21 by the partition 20'. The screw extends through the port 21, and in the movements of the valve 23 slides up and down in the port. When the valve 23 is at its upper limit, the port 21 is closed, and at its lower limit open. The lower end of the valve 23 is preferably closed, as shown, and the space 24 between the partition or bottom 20' and the bottom of the valve forms a dashpot or regulating-chamber for causing a gradual and controlled closing of the main valve 17.

The fit between the valve-chamber 20 and the valve or sleeve 23 will be closed or loose, according to the condition of pressure, character of the fluid dispensed, &c. The main valve 17 reciprocates within the chamber 20 and is acted on slowly by the fluid-pressure on its under side, owing to the restricted inlet thereto.

The valve or sleeve 23 preferably cuts off the fluid from the chamber 20 just before the main valve 17 reaches its seat 3.

The operation is as follows: The valve being seated, a slight pressure upon the knob 12 will start the valve 17 from its seat and will move the valve 23, so as to uncover slightly the side port 21. The water-pressure will then bear down on the main valve and counteract the upward pressure to such an extent that a small child can easily open the cock against a much higher pressure than it can ever be subjected to. While the valves are moving to opening position, the sleeve or valve 23 is performing an important function, as fluid is sucked into the enlarged space or regulating-chamber 24, which steadies and partially balances the main valve 17. When pressure is removed from the knob 12, the fluid-pressure against the closed end of the sleeve 23 starts it upwardly or in the direction of the flow of the fluid. The fluid imprisoned in the chamber 24 having to be expelled therefrom, causing the seating movement of the valve 17 to be gradual, the speed of the valve in closing depends upon the closeness of fit between the wall of the valve-chamber 20 and the sleeve 23, and changes in such fit can be made to give varying degrees of speed both in the opening and closing movements or to comply with the conditions or kinds of fluid and their varying pressures, &c. The water which follows the valve-rod up into the drainage-chamber is drawn down and away through the inclined channel 6 into the delivery-spout 4 by the attraction of this larger stream as it expands and spreads out in passing from the comparatively contracted channel 4' to the larger channel leading to the extremity of delivery-spout 4. I not only provide a drainage-port in the bonnet, but I also provide a vent through the upper bonnet which permits the atmospheric pressure to open the valve when fluid-pressure is cut off and also prevents any drip following the closing of the valve, the entire contents of the drain-chamber being immediately expelled as the valve closes.

The automatic following of the valve 17 or the adjustment of the same to the natural wear thereof against its seat is important and consists simply in initially locating the sleeve-valve 23 so that there will be extensive space for movement left between the interior of the sleeve and the end of valve-chamber 20 and between the upper edge of sleeve and the extended upper end of valve-chamber where it screws onto or into central fitting to allow for the natural wear of the valve before these parts come into contact. The sleeve 23 does not have to fit so closely or snugly as to be liable to clog or stick when the water is muddy or slimy. The vent 9 through the bonnet 8 permits all the fluid which has crept up past the valve-stem 16 to empty or escape from the drainage-chamber 18 quickly when the valve closes, as no atmospheric seal can occur at the extremity of the delivery-spout, as always does occur where diaphragms, packings, stuffing-boxes, or the like are used around the valve-stems or push-button shanks. The cut-off is positive and quick and no after drip follows the closing of the valve.

In the leading claims of this application I do not wish details of form, proportion, and location to be implied, but only such limitations upon the parts as are expressly stated in said claims.

Having described my invention, I claim—

1. The combination with a valve-shell and valve, of a fluid pressure and flow regulating and valve-governing device, comprising a hollow, stationary, inner member surrounding and inclosing the valve seat or opening and having an inlet-port through its side, and a hollow, movable, outer member connected to and movable with the valve and telescoping over the inlet-port portion of said stationary member.

2. The combination with a valve and valve-operating rod, of a valve-shell having a valve seat and opening and a contracted delivery-channel leading from the valve-seat and opening to the delivery-spout, and an enlarged channel leading from said contracted channel to the end of the delivery-spout and provided with a drainage-chamber and an inclined drainage-channel leading from the drainage-chamber to the junction between said contracted delivery-channel and said enlarged channel, and a fluid pressure and flow regulating valve-governing device, comprising a hollow stationary inner member surrounding and inclosing the valve seat or opening and having an inlet-port through its side, and a hollow movable outer member connected to and movable with the valve and telescoping over the inlet-port portion of said stationary member.

3. The combination with a valve and valve-operating rod, of a valve-shell having a valve seat and opening and a contracted delivery-channel leading from the valve seat and opening to the delivery-spout, and an enlarged channel leading from said contracted channel to the end of the delivery-spout and provided with a drainage-chamber and an inclined drainage-channel leading from the drainage-chamber to the junction between said contracted delivery-channel and said enlarged channel, and a removable cap or bonnet provided with a vent-opening.

4. In combination, a casing, a valve-seat therein, a valve, a stationary ported member separating and protecting the valve from fluid-flow and fluid-pressure, and a movable cup-shaped member connected to the main valve and surrounding the stationary member.

5. In combination, a main valve and valve-seat, a stationary ported member detachably secured to the valve-casing, and through which the fluid passes on its way to the main valve and a cup-shaped member surrounding the ported member and serving as an auxiliary valve for the ports of the stationary member, said cup-shaped member having an extensive movement to automatically compensate for wear of the main valve.

6. In a valve, a shell, a hollow member closing the bottom of the shell, and provided with an inlet-port, a valve-seat in said shell, a valve adapted to said seat, a secondary valve, a cross-pin connecting said valves.

7. In a valve, a shell, a hollow member inclosing the bottom of the shell, and provided with an inlet-port, a valve-seat in said shell, a valve adapted to said seat, a secondary valve, a cross-pin connecting said valves and extending through the said inlet-port.

8. In a valve, two valve-openings at an angle to each other, two valves controlling said openings and movable in the same direction, and a pin extending transversely of the said direction to connect the valves.

In testimony whereof I have signed my name to this specification, in the presence of two subscribing witnesses, this 31st day of October, 1903.

FREDERIC H. MASON.

Witnesses:
L. M. PHILLIPS,
WM. L. PIERCE.